…

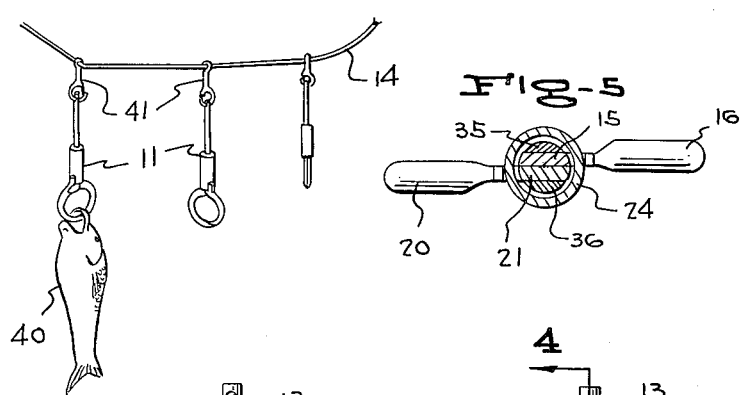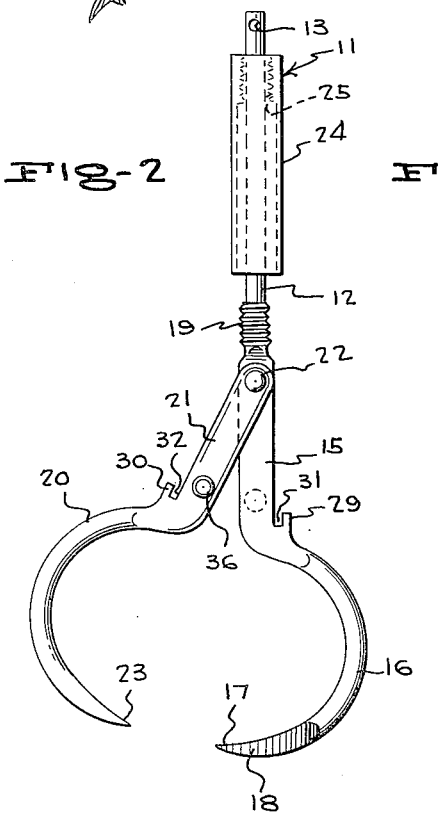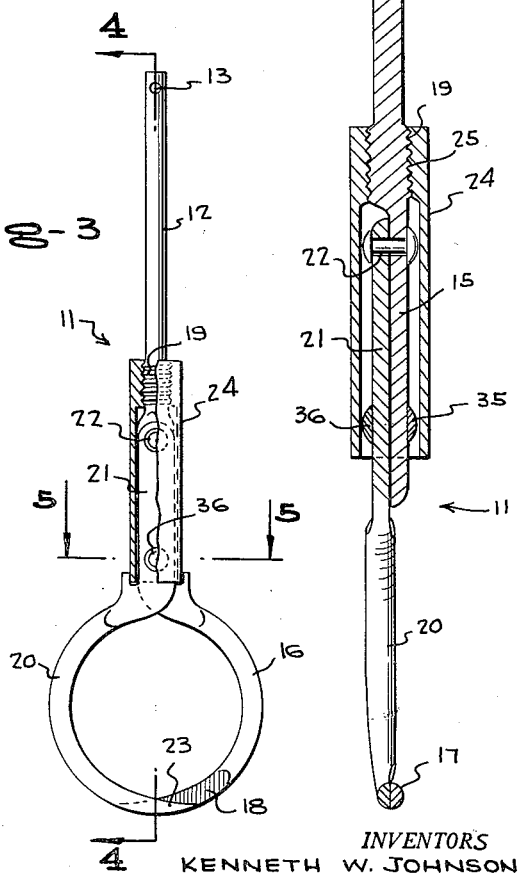
INVENTORS
KENNETH W. JOHNSON,
NEIL D. HOUK
BY McMorrow, Berman & Davidson
ATTORNEYS

United States Patent Office 2,991,530
Patented July 11, 1961

2,991,530
FISH STRINGER
Kenneth W. Johnson, 2113 S. Jefferson, and Neil D. Houk, 1017 S. Covell, both of Sioux Falls, S. Dak.
Filed Nov. 21, 1958, Ser. No. 775,567
1 Claim. (Cl. 24—241)

This invention relates to devices for holding fish on a string or line, and more particularly to a fish stringer device adapted to be attached to a fish and provided with means for slidably receiving a fish stringing line so that the fish may be supported on the line.

A main object of the invention is to provide a novel and improved fish stringing device which is simple in construction, which is easy to manipulate and which securely holds a fish so that it will not become detached therefrom and so that it will be slidably retained on a fish stringing line in a safe and secure manner.

A further object of the invention is to provide an improved fish stringing device which is inexpensive to fabricate, which is durable in construction, and which involves only a few parts, the device being provided with means for locking same when engaged with a fish so that the fish cannot accidentally become detached therefrom but being easy to unlock when it is desired to disengage same from the fish.

Further objects and advantages of the invention will become apparent from the following description and claim, and from the accompanying drawings, wherein:

FIGURE 1 is an elevational view of a fish stringer line on which are engaged a plurality of fish stringer devices according to the present invention, one of the devices being shown engaged with a fish to illustrate the manner in which the fish is supported from the stringer line by means of the stringing device of the present invention.

FIGURE 2 is an enlarged side elevational view of one of the fish stringing devices employed in FIGURE 1, shown with its hook elements in separated positions.

FIGURE 3 is a side elevational view, similar to FIGURE 2, but partly in vertical cross section, and showing the hook elements of the device locked in closed position.

FIGURE 4 is an enlarged vertical cross sectional view taken on the line 4—4 of FIGURE 3.

FIGURE 5 is an enlarged horizontal cross sectional view taken on the line 5—5 of FIGURE 3.

Referring to the drawings, 11 generally designates a fish stringing device according to this invention. The stringing device 11 comprises a main shank member 12 formed at its top end, as viewed in FIGURE 2, with an opening 13 for connecting same to a fish stringer line 14 in the manner illustrated in FIGURE 1.

The shank 12 is formed at its lower portion, as viewed in FIGURE 2, with a straight, flattened stem portion 15 which merges with an arcuately curved hook element 16, said hook element 16 being provided at its ends with a sharpened tip or barb 17 having a flat inside surface 18 which is substantially in the same plane as the inside surface of the elongated straight flattened stem portion 15.

The main shank 12 is formed above the stem portion 15 with the external threads 19. Designated at 20 is a second arcuate hook member which is similar to and in opposing relationship with the hook element 16, the hook element 20 being formed with a straight elongated stem portion 21 having a flattened inside face disposed closely adjacent to the inside face of the stem portion 15 of hook 16. The stem portion 21 is pivotally connected at its end to the top end portion of stem portion 15 by a transverse rivet 22, so that hook element 20 is swingable outwardly and away from hook element 16 at times in the manner illustrated in FIGURE 2, whereby the tip 23 of hook element 20 may be separated from the tip 17 of hook element 16.

Tip 23 is formed with a flattened inside surface similar to and engageable against the flattened inside surface 18 of tip 17.

Designated at 24 is a sleeve member which is slidably engaged on the main shank 12, said sleeve member being slidable downwardly from the position shown in FIGURE 2 to a position receiving and covering the elongated flattened stem portions 21 and 15, the sleeve member 24 being formed at its upper portion, as viewed in FIGURE 2, with internal threads 25 which are threadedly engageable with the external threads 19 of main shank 12. The respective hook elements 16 and 20 are formed at their upper portions, as viewed in FIGURE 2, with upstanding lugs 29 and 30, spaced from the respective stem portions 15 and 21 to define respective notches 31 and 32 adapted to receive the bottom rim of sleeve member 24 when the sleeve member is completely threaded onto the external threads 19 of shank 12. In this position of sleeve member 24, which is shown in FIGURE 3, the bottom rim of the sleeve member is lockingly engaged in the notches 31 and 32 and the opposing hook elements 16 and 20 are locked in closed positions with the flattened inside surfaces of their portions 17 and 23 in overlapping relationship, as is clearly shown in FIGURES 3 and 4.

To insure against undesired transverse separation of the stem portions 21 and 15, said stem portions are provided at their lower ends with outwardly projecting lugs 35 and 36 which are engageable with the inside surface of the lower portion of sleeve member 24 to prevent transverse spreading of said stem portions 15 and 21.

In using the device, the sleeve member 24 is first elevated to the position shown in FIGURE 2, allowing the hook element 20 to be pivoted outwardly from the hook element 16. The hook elements are then engaged with the fish, shown at 40, in FIGURE 1, and are forced together through the selected portion of the fish, for example, through a mouth portion of the fish, so as to define a closed ring. Sleeve 24 is then lowered and threaded onto the external threads 19 to lock the hook elements 16 and 20 in their closed positions, as shown in FIGURE 3, whereby the device is locked and whereby the fish is securely fastened thereto. The device may then be suspended on the stringer line 14 in the manner illustrated in FIGURE 1 by means of a suitable swivel connector 41 of conventional construction which is engageable through the aperture 13 in the top end of the main shank 12 of the device.

As shown in FIGURE 1, several of the devices may be slidably supported on the stringer line 14 by the use of swivel hooks 41 in the manner illustrated, whereby a plurality of fish may be supported on the stringer line 14.

While a specific embodiment of an improved fish stringing device has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A fish stringing device comprising a main shank member, one end portion of said main shank member being formed with an aperture for slidably connecting said main shank member to a stringer line, a generally semicircular hook element formed on the other end portion of said main shank member, a second generally semicircular hook member opposing said first hook element, said second hook element having a straight stem portion at one end thereof, means pivotally connecting the top end of said straight stem portion to the main shank member at a location thereon such that the opposing semicircular hook elements are adapted to define a closed, generally circular supporting ring when the stem portion is in overlapping aligned relation with said main shank member, external screw threads on the main shank member immediately above the pivotal connection, a rigid sleeve member slidably mounted on said main shank member, internal threads in the top portion of said sleeve member, extending to the top end thereof and being threadedly engageable with said external screw threads, respective upstanding lugs on the hook elements respectively adjacent to the main shank member and the stem portion and spaced outwardly therefrom to define respective upwardly facing notches between the lugs and the adjacent portion of the main shank member and the stem portion, the sleeve member being of sufficient length so that the bottom rim thereof is lockingly receivable in said notches when the internal threads on the top portion of the sleeve member are engaged with the external threads on the main shank member, and outwardly projecting lugs on the lower end portions of said main shank member and said stem portion engageable with the inside surface of the lower portion of the sleeve member to prevent transverse spreading of the stem portion and main shank member.

References Cited in the file of this patent
UNITED STATES PATENTS

| | | |
|---|---|---|
| 526,898 | Hagen | Oct. 2, 1894 |
| 1,042,224 | Hite | Oct. 22, 1912 |
| 1,049,875 | Krueger | Jan. 7, 1913 |
| 1,314,114 | Anderson | Aug. 26, 1919 |
| 1,340,105 | Bettger | May 11, 1920 |
| 2,845,677 | Powell | Aug. 5, 1958 |
| 2,917,800 | Gee | Dec. 22, 1959 |